United States Patent [19]
Tomlinson

[11] Patent Number: 5,628,179
[45] Date of Patent: May 13, 1997

[54] STEAM ATTEMPERATION CIRCUIT FOR A COMBINED CYCLE STEAM COOLED GAS TURBINE

[75] Inventor: Leroy O. Tomlinson, Schenectady, N.Y.

[73] Assignee: General Electric Co., Schenectady, N.Y.

[21] Appl. No.: 417,426

[22] Filed: Apr. 5, 1995

Related U.S. Application Data

[63] Continuation-in-part of Ser. No. 161,070, Dec. 3, 1993, Pat. No. 5,428,950, which is a continuation-in-part of Ser. No. 145,633, Nov. 4, 1993, Pat. No. 5,412,937.

[51] Int. Cl.$^6$ .................................................. F02C 6/18
[52] U.S. Cl. .................. 60/39.02; 60/39.182; 122/7 R
[58] Field of Search .......................... 60/39.02, 39.182; 122/7 R, 7 B

[56] References Cited

U.S. PATENT DOCUMENTS

| | | | |
|---|---|---|---|
| 4,013,877 | 3/1977 | Uram et al. | 60/39.182 |
| 4,099,374 | 7/1978 | Foster-Pegg | 60/39.182 |
| 4,424,668 | 1/1984 | Mukherjee . | |
| 4,519,207 | 5/1985 | Okabe et al. . | |
| 5,042,247 | 8/1991 | Moore . | |
| 5,199,256 | 4/1993 | Moore . | |
| 5,253,976 | 10/1993 | Cunha . | |
| 5,375,410 | 12/1994 | Briesch et al. | 60/39.182 |
| 5,412,937 | 5/1995 | Tomlinson et al. . | |

FOREIGN PATENT DOCUMENTS

| | | |
|---|---|---|
| 0363979 | 4/1988 | European Pat. Off. . |
| 0379930 | 8/1990 | European Pat. Off. . |

OTHER PUBLICATIONS

"GE Combined-Cycle Product Line and Performance", Chase et al, GE Power Generation, 38th GE Turbine State-of-the-Art Technology Seminar, Aug. 1994.

"Combined-Cycle Experience", Maslak et al., GE Power Generation, 38th GE Turbine State-of-the-Art Technology Seminar, Aug. 1994.

"Single-Shaft Combined-Cycle Power Generation System", Tomlinson et al., GE Power Generation, 38th Turbine State-of-the Art Technology Seminar, Aug. 1994.

*Primary Examiner*—Louis J. Casaregola
*Attorney, Agent, or Firm*—Nixon & Vanderhye

[57] ABSTRACT

In a combined cycle system including a gas turbine, a steam turbine and a heat recovery steam generator (HRSG), wherein gas turbine exhaust gas is used in the heat recovery steam generator for heating steam for the steam turbine, the gas turbine exhaust gas flowing from an entry end to an exit end of the HRSG, and wherein the HRSG includes at least one high pressure evaporator arranged to supply steam to a superheater including multiple passes including a first pass at one end thereof adjacent the evaporator, and a final pass adjacent an opposite end thereof and adjacent the entry end of the heat recovery steam generator, and one or more intermediate passes between the first and final passes, the improvement comprising an attemperating conduit not exposed to the gas turbine exhaust gas, connecting the one end and the opposite end of the superheater, bypassing the intermediate passes to thereby introduce cooler superheated steam from the one end into the superheater at the opposite end.

10 Claims, 2 Drawing Sheets

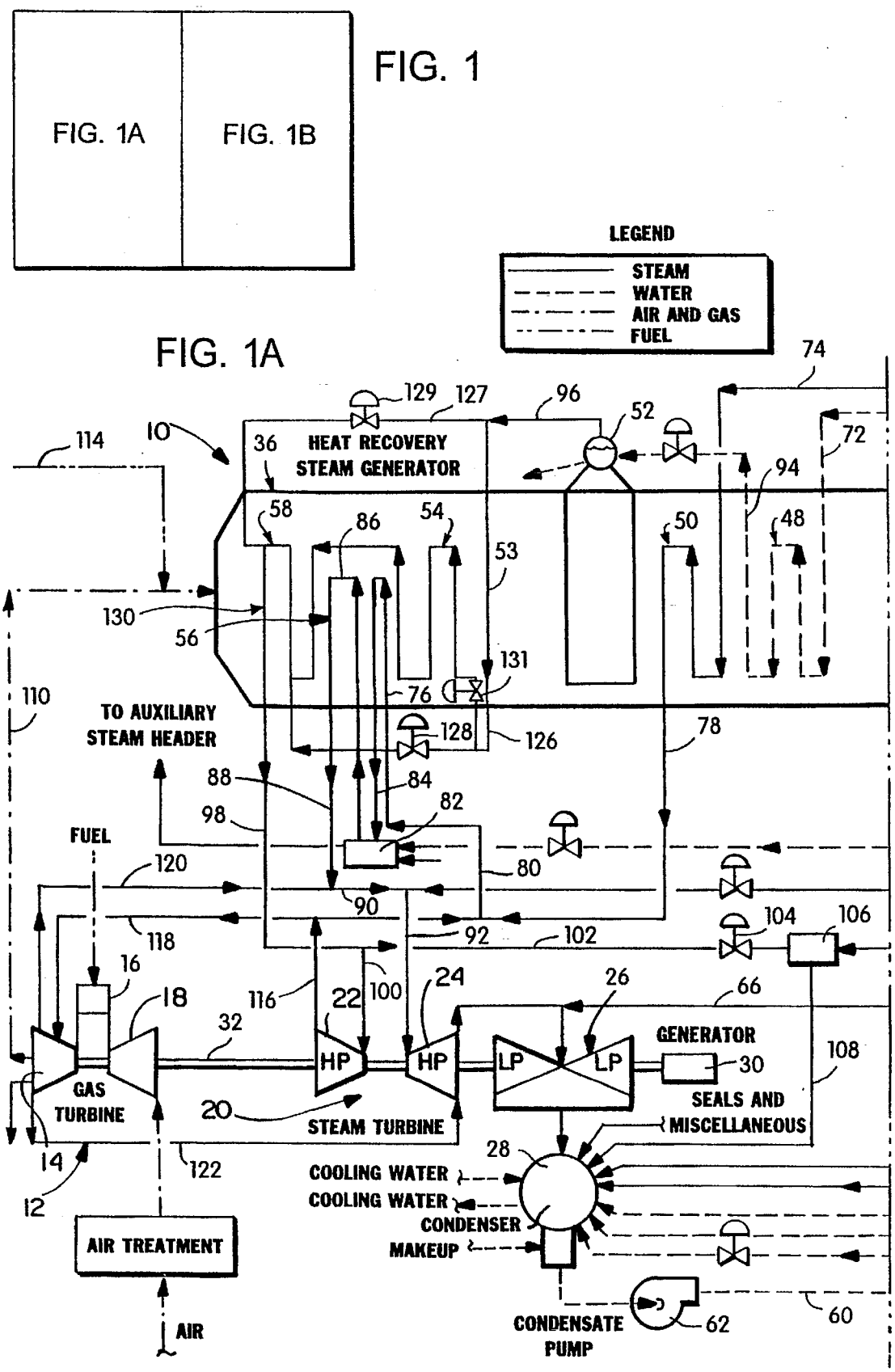

STEAM ATTEMPERATION CIRCUIT FOR A COMBINED CYCLE STEAM COOLED GAS TURBINE

RELATED APPLICATIONS

This application is a continuation-in-part of application Ser. No. 08/161,070 filed Dec. 3, 1993 (U.S. Pat. No. 5,428,950) which, in turn, is a continuation-in-part of application Ser. No. 08/145,633 filed Nov. 4, 1993, also allowed (U.S. Pat No 5,412,937), both of which are incorporated herein by reference.

TECHNICAL FIELD

This invention relates to power generation systems, and to combined cycles in which exhaust gases from a gas turbine are recovered in an unfired or fired heat recovery steam generator followed by steam turbine expansion. The invention relates specifically to steam attemperation of superheated steam in the heat recovery steam generator.

BACKGROUND PRIOR ART

In typical combined cycle power generation systems, cooling of gas turbine high temperature components and the accompanying steam cycle are usually of the following types:

(1) Air Cooled Gas Turbine—The gas turbine high temperature components are cooled by air extracted or conducted from other components in the gas turbine cycle. The steam cycle and the gas turbine coolant streams are not integrated.

(2) Water Cooled Gas Turbine—The gas turbine high temperature components are cooled with water in the liquid phase. The heat extracted from the high temperature gas turbine components is integrated with the combined cycle steam bottoming cycle. The energy extracted from the high temperature section of the gas turbine is transported to the low temperature portion of the steam cycle to maintain the water in the liquid phase, thus compromising thermal efficiency of the cycle.

(3) Steam Cooled Gas Turbine Integrated Into a Combined Cycle with Multiple Pressure—This cycle uses steam from the low pressure section of a multiple pressure combined cycle heat recovery steam generator (HRSG) to cool the high temperature components of the gas turbine with energy extracted from the gas turbine returned to the low pressure section of the steam cycle. This system is described in U.S. Pat. No. 4,424,668.

In combined cycle systems, as disclosed in parent application Ser. No. 08/161,070, superheated steam temperature leaving the HRSG is controlled (and cooled) by injection of a water spray in a conventional steam attemperator located upstream of the final superheater passes. The water source is typically a high pressure feed water pump located upstream of the HRSG economizer. It has been found, however, that contamination of the HRSG superheater and ultimately the gas turbine and/or steam turbine itself could result by reason of the introduction of unpurified water into the attemperator.

SUMMARY OF THE INVENTION

It is the principal object of this invention to remedy the aforementioned contamination problem by controlling the steam temperature in the superheater of the HRSG by injection of steam from an upstream section of the superheater, which has been purified in the high pressure (HP) evaporator and steam drum of the HRSG, back into another pass of the superheater, at a downstream location (relative to the direction of steam flow, which is counter to the direction of gas turbine exhaust flow, i.e., at the front end of the HRSG where gas turbine exhaust gases are introduced and, hence, where gas turbine exhaust temperatures are highest). A control valve is employed in the circuit to control the admission of attemperating steam and thus the steam temperature exiting the HRSG.

More specifically, steam is extracted from one end (the rearward end) of the HRSG superheater adjacent the HP evaporator and remote from the forward end of the superheater, and reintroduced at a cooler but still superheated temperature at the forward end of the superheater adjacent the gas turbine exhaust gas entry end of the HRSG, bypassing one or more intermediate passes of the superheater. The extracted steam is not exposed to the gas turbine exhaust gases and is thus cooler when it is reintroduced to the forward end of the superheater.

Prior art related to the mixing of low temperature steam with high temperature steam for controlling the temperature of the combined stream in combined cycle HRSG systems has been the extraction of steam from a steam drum bypassing the entire superheater in a conduit outside the HRSG gas path and mixing it with the steam that has passed through the superheater at a mixing point that is located downstream of the superheater. This configuration has experienced the following two problems:

1. If the pressure of the saturated steam from the steam drum is higher than 600 psia (41.3 bara), part of the steam will condense when its pressure is reduced when it passes through a control valve, thus requiring a continuous drain to remove the condensate.

2. When the gas turbine exhaust gas temperature is high, situations have arisen where the temperature control bypasses a large amount of steam from the steam drum to the mixing point thereby reducing flow through the superheater so that there is insufficient steam to cool the superheater tubes, and overheating and damage to the tubes occur.

This new steam attemperator technique provides control of the superheater and reheater (if present) by reduction of the superheated steam temperature in the forward end of the superheater, and by reduction of the gas turbine exhaust gas temperature (by absorption of additional heat into the now cooler superheated steam).

Thus, in its broader aspects, the present invention relates to a combined cycle system including a gas turbine, a steam turbine and a heat recovery steam generator, wherein gas turbine exhaust gas is used in the heat recovery steam generator for producing and heating steam for the steam turbine, the gas turbine exhaust gas flowing from an entry end to an exit end of the heat recovery steam generator, and wherein the heat recovery steam generator includes at least one high pressure evaporator arranged to supply steam to a superheater including multiple passes including a first pass at one end thereof adjacent the evaporator, a final pass adjacent an opposite end thereof, and adjacent the entry end of the heat recovery steam generator, and one or more intermediate passes between the first and final passes, the improvement comprising an attemperation conduit not exposed to gas turbine exhaust gas connecting the one end and the opposite end of the superheater, bypassing the intermediate passes, to thereby introduce cooler superheated steam from the one end into the superheater at the opposite end.

In another aspect, the invention relates to a reheat steam cycle configuration for a steam turbine and gas turbine combined cycle system comprising a steam turbine connected to a load; a condenser for receiving exhaust steam from the steam turbine and for condensing the exhaust steam to water; at least one heat recovery steam generator for receiving water from the condenser and for converting the water to steam for return to the steam turbine; at least one gas turbine for supplying heat to the heat recovery steam generator in the form of exhaust gases; wherein the at least one heat recovery steam generator includes a reheater for receiving cold reheat steam from the steam turbine and a superheater for receiving high pressure steam from a high pressure evaporator within the heat recovery steam generator, the superheater having first and final passes at opposite ends with one or more intermediate passes therebetween, and wherein the cold reheat steam and the high pressure steam flow in a direction opposite to that of the exhaust gases from the gas turbine, the final pass of the superheater being located within the heat recovery steam generator where gas turbine exhaust gas temperatures are highest, and wherein an attemperating conduit extends outside said heat recovery steam generator and connects the opposite ends of the superheater.

In still another aspect, the invention relates to a method of controlling temperature of superheated steam in a heat recovery steam generator which includes at least one evaporator and a superheater having first and opposite ends thereof and one or more intermediate passes therebetween, the method comprising the steps of:

a) extracting superheater steam from the steam drum or the first end of the superheater adjacent the at least one evaporator;

b) conducting the extracted steam outside the heat recovery steam generator; and c) reintroducing the extracted steam at the second end of the superheater.

Gas turbine and steam turbine combined cycle systems in which the gas turbine and steam turbine operate independently, each driving a dedicated generator, require that low temperature steam be supplied to the steam turbine for staring it while the gas turbine operates at high load and high temperature of exhaust gas supplied to the HRSG. This condition is satisfied by a second attemperation stage in which all or a portion of the steam is extracted from the steam drum, bypassing all of the superheater except the high temperature pass that is exposed to the exhaust gas from the gas turbine at the highest temperature, and readmitting the steam to the superheater upstream of this high temperature superheater pass. The low temperature steam admitted to the high temperature pass cools the exhaust gas sufficiently so that it does not overheat and damage the superheater surface, or reheater surface if used, that has no steam flow through it. A valve is included in the main superheater circuit which can restrict or shut off steam flow through this heat transfer surface. This second attemperator stage is operated when the steam pressure is below that which would cause the saturated steam extracted from the evaporator drum from the condensing when the pressure is decreased by the flow control valve.

The invention is described in greater detail herein, in conjunction with the drawings described below.

BRIEF DESCRIPTION OF THE DRAWINGS

FIG. 1 is a schematic showing the manner of separation of FIG. 1A and 1B; and

FIGS. 1A and 1B together comprise a partial schematic flow diagram in accordance with this invention.

BEST MODE FOR CARRYING OUT THE INVENTION

Figure 1B:
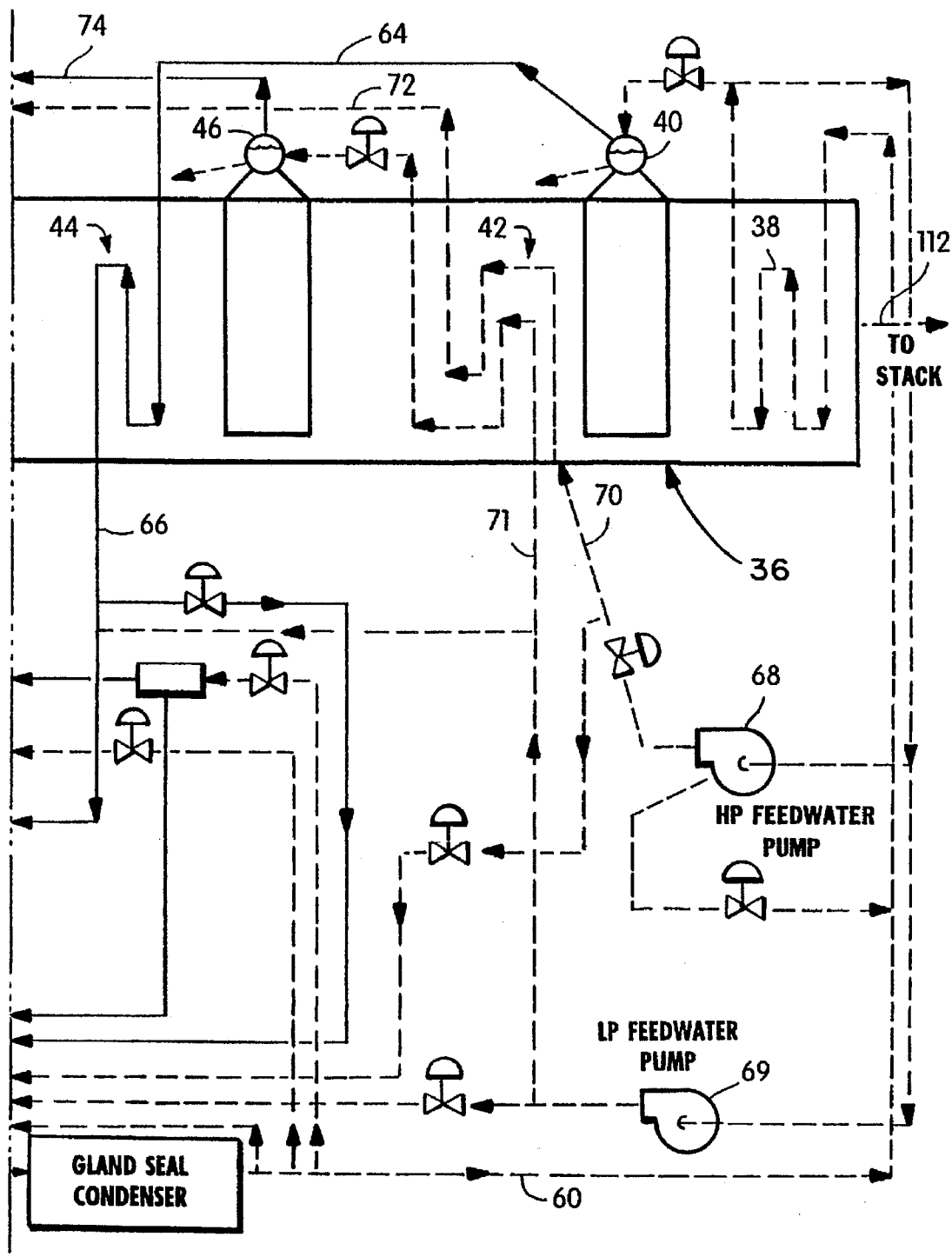

With reference now to FIGS. 1A and 1B, the invention is incorporated in a single pressure or a multi-pressure reheat combined cycle power generation system 10. This embodiment includes a gas turbine system 12 comprising a compressor 18, a combustion system 16 and a gas turbine 14. A steam turbine system 20 includes a high pressure section 22, an intermediate pressure section 24 and one or more low pressure sections 26 with multiple steam admission points at different pressures. The low pressure section 26 exhausts into a condenser 28. The steam turbine drives the generator 30 which produces electrical power. The gas turbine 12, steam turbine 20 and generator 30 are arranged in tandem, on a single shaft 32.

The steam turbine system 20 is associated with a multi-pressure HRSG 36 which includes an LP economizer 38, and LP evaporator 40, an HP and IP economizer 42, a low pressure superheater 44, an IP evaporator 46, an HP economizer 48, an optional IP superheater 50, an HP evaporator 52, a first HP superheater section 53, at least one intermediate HP superheater section 54, an IP reheater 56, and a final HP superheater section 58, all arranged substantially as disclosed in parent application Ser. No. 08/161,070.

Condensate is fed from condenser 28 to the HRSG 36 via conduit 60 with the aid of pump 62. The condensate subsequently passes through the LP economizer 38 and into the LP evaporator 40. Steam from the low pressure evaporator 40 is fed to the LP superheater 44 via conduit 64 and is then returned to the low pressure section 26 of the steam turbine 20 via conduit 66 and appropriate LP admission stop/control valves (not shown).

Feedwater with the aid of pumps 68 and 69 passes through the HP and IP economizers 42 via conduits 70 and 71 and then to the final HP economizer 48 via conduit 72. At the same time, steam from the IP evaporator 46 passes through the optional IP superheater 50 via conduit 74, and then flows through one pass 76 of the reheater 56 via conduits 78, 80 and through an attemperator 82 via conduit 84. After flowing through a second pass 86 of the reheater 56, the reheated steam is returned to the IP section 24 of the steam turbine 20 via conduits 88, 90 and 92 (and appropriate stop/control valves not shown).

Meanwhile, condensate in the final HP economizer 48 is passed to the HP evaporator 52 via conduit 94. Steam exiting the HP evaporator 52 via conduit 96 passes through the superheater sections 53, 54 and 58, and is returned to the HP section 22 of the steam turbine 20 by way of conduits 98, 100 and appropriate stop/control valves (if required, not shown). A portion of the HP steam from superheater section 58 may be directed via conduit 102 and bypass valve 104 to the attemperator 106, and then back to the condenser 28 via conduit 108 (typically on start-up).

Heat is provided to the HRSG 36 by the exhaust gases from gas turbine 22 introduced into the HRSG 36 via conduit 110 and which exit the HRSG 36 via a stack (not shown) via conduit 112. Optional fuel may be added to the HRSG 36 via conduit 114.

Low pressure cooling steam (also referred to as gas turbine cooling steam) is taken from the steam turbine HP section 22 discharge (i.e., the normal HP section discharge or exhaust outlet) and supplied, via conduits 116, 118 to the turbine section 14 of the gas turbine 12 for cooling the hot gas path parts. The cooling steam heated by the gas turbine cooling duty, is then conducted directly to the inlet of the IP section 24 of the steam turbine 20 via conduit 120, but in the preferred arrangement, this (now heated) cooling steam is mixed with steam from conduit 88 from the reheater 56 in the HRSG 36, before admission to the IP section 24 of the steam turbine 20 via conduit 92 for further expansion. Also shown in the Figure is a gland leak off conduit 122 by which a very small amount of steam leak off from the gas turbine rotor gland is returned to the exhaust of the IP section 24 of the steam turbine 20.

The system as otherwise shown in the FIGS. 1A and 1B is substantially as disclosed in parent application Ser. No. 08/161,070 and need not be described in any further detail. As indicated above, the significant aspect of this embodiment, i.e., the low pressure gas turbine cooling steam arrangement, optimizes the mechanical design of the cooled gas turbine parts in that it permits such parts to have thinner walls (relative to the thicker walls required when high pressure cooling steam is employed as described in conjunction with FIGS. 1–3).

The above referenced schematic flow diagram shows a cycle incorporating drum type evaporators with natural circulation. The system described herein can also be implemented with once-through steam generators or forced circulation evaporators.

As already mentioned above, it has been the practice to control the steam temperature in the forward section 58 of the superheater 56 by a water spray introduced into an attemperator located downstream of the first pass 53 of the superheater in order to control the temperature of the steam. This is because the gas turbine exhaust gas is usually allowed to exceed the steam turbine operating temperature by about 100° F., and the water spray/attemperator system has been used to cool the superheated steam to the appropriate operating temperature.

It has been found, however, that the water spray input to the attemperator from, for example, the feedwater pump 68 (similar to the arrangement in FIG. 4 of parent application Ser. No. 08/161,070) can be problematical if the water contains impurities. As a result, it has been determined that pure steam would provide an attractive alternative to the conventional water spray.

Accordingly, the invention here utilizes steam from one end of the superheater, i.e., from a pass in the superheater section 53, to control (cool) the temperature of the superheated steam in section 58 at the opposite end. Thus, as shown, conduit 126 carries superheated steam from the first pass of superheater section 53 to the forward end of superheater section 58, at or near the final pass, and ahead of the reheater 56. This attemperating steam is taken outside the HRSG so as not to be exposed to the gas turbine exhaust gas, under the control of valve 128. In other words, the superheated steam extracted via conduit 122 is cooler than the superheated steam in the forward section 58. As a result, the superheated steam entering section 58 is cooler, allowing a greater reduction in the gas turbine exhaust gas temperature by reason of enhanced absorption of heat into the superheated steam in section 58. This, in turn, provides temperature control of both the superheater and the reheater 56

Those systems that require low temperature steam for starting a cold steam turbine are accommodated by the optional second attemperation stage in which steam is extracted from the steam drum through conduit 127 and admitted to the high temperature pass of the superheater 130 by opening valve 129 and closing or restricting flow with valves 128 and 131. All or a portion of the steam flow bypasses all of the superheater, 53 and 54. This limits the superheating of the steam since it passes through only one superheater heat transfer pass 130 while cooling the exhaust gas stream 110 so that the remaining superheater surface or reheater 86 surface will not be overheated and damaged..

It will be appreciated that steam taken from the superheater via conduit 122 has been substantially purified in the drum of the high pressure evaporator 52, so that the contamination problem attendant conventional attemperators has been substantially eliminated.

The above described arrangement is applicable to any combined cycle system in both reheat and non-reheat cycles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle system including a gas turbine, a steam turbine and a heat recovery steam generator, wherein gas turbine exhaust gas is used in the heat recovery steam generator for heating steam for the steam turbine, said gas turbine exhaust gas flowing from an entry end to an exit end of the heat recovery steam generator, and wherein said heat recovery steam generator includes at least one high pressure evaporator arranged to supply steam to a superheater including multiple passes including a first pass at one end thereof adjacent the evaporator, and a final pass adjacent an opposite end thereof and adjacent the entry end of the heat recovery steam generator, and one or more intermediate passes between the first and final passes, the improvement comprising an attemperating conduit not exposed to the gas turbine exhaust gas, connecting said one end of said superheater and said finish pass of said superheater, bypassing the intermediate passes to thereby introduce cooler superheated steam from said one end into said superheater at said opposite end to thereby allow a greater reduction in gas turbine exhaust temperature by reason of enhanced absorption of heat into the superheated steam in said opposite end of said superheater.

2. The system of claim 1 and including a flow control valve in said attemperating conduit.

3. The system of claim 1 and including means for supplying gas turbine cooling duty steam from a high pressure section of the steam turbine and conducting the gas turbine cooling duty steam to the gas turbine for cooling hot gas turbine parts, and means for returning the gas turbine cooling duty steam to an intermediate pressure section of the steam turbine.

4. The improvement of claim 3 wherein steam from a reheater in the heat recovery steam generator is mixed with said gas turbine cooling duty steam before the gas turbine cooling duty steam is returned to the intermediate pressure section of the steam turbine.

5. A reheat steam cycle configuration for a steam turbine and gas turbine combined cycle system comprising:

a steam turbine connected to a load;

a condenser for receiving exhaust steam from the steam turbine and for condensing said exhaust steam to water;

at least one heat recovery steam generator for receiving water from said condenser and for converting said water to steam for return to said steam turbine;

at least one gas turbine for supplying heat to said heat recovery steam generator in the form of exhaust gases;

wherein said at least one heat recovery steam generator includes a reheater of receiving cold reheat steam from the steam turbine and superheater for receiving high pressure steam from a high pressure evaporator within said heat recovery steam generator, said superheater having first and final passes at opposite ends with one or more intermediate passes therebetween, and wherein said cold reheat steam and said high pressure steam flow in a direction opposite to that of said exhaust gases from said gas turbine, said final pass of said superheater being located within said heat recovery steam generator where gas turbine exhaust gas temperatures are highest, and wherein an attemperating conduit extends outside said heat recovery steam generator and connects said opposite ends of said superheater so as to introduce cooler superheated steam from said first pass into said final pass of said superheater.

6. The system of claim 5 and including a flow control valve in said attemperating conduit.

7. The system of claim 5 and including means for supplying gas turbine cooling duty steam from a high pressure section of the steam turbine and conducting the gas turbine cooling duty steam to the gas turbine for cooling hot gas turbine parts, and means for returning the gas turbine cooling duty steam to an intermediate pressure section of the steam turbine.

8. A method of controlling temperature of superheated steam in a heat recovery steam generator which includes at least one evaporator and a superheater having first and second opposite ends thereof and one or more intermediate passes therebetween, the method comprising the steps of:

a) extracting superheater steam from the first end of the superheater in the heat recovery steam generator adjacent said at least one evaporator;

b) conducting the extracted steam outside the heat recovery steam generator; and c) reintroducing the extracted steam into the heat recovery steam generator at the second end of said superheater.

9. The method of claim 8 and including the step of determining an amount of superheated steam to be reintroduced in step (b) by a control valve.

10. The method of claim 8 wherein the superheated steam is hotter at said second end than at said first end.

* * * * *